(12) United States Patent
Huang et al.

(10) Patent No.: US 8,969,873 B2
(45) Date of Patent: Mar. 3, 2015

(54) ELECTROPHORETIC DISPLAY AND PIXEL STRUCTURE THEREIN

(75) Inventors: Sheng-Wen Huang, Hsin-Chu (TW); Chun-Hung Chu, Hsin-Chu (TW); Chih-Jen Hu, Hsin-Chu (TW)

(73) Assignee: AU Optronics Corporation, Hsin-Chu (TW)

( * ) Notice: Subject to any disclaimer, the term of this patent is extended or adjusted under 35 U.S.C. 154(b) by 1176 days.

(21) Appl. No.: 12/904,472

(22) Filed: Oct. 14, 2010

(65) Prior Publication Data

US 2011/0285617 A1 Nov. 24, 2011

(30) Foreign Application Priority Data

May 21, 2010 (TW) .............................. 99116350 A

(51) Int. Cl.
*H01L 29/08* (2006.01)
*G02F 1/1343* (2006.01)
*G02F 1/167* (2006.01)
*G02F 1/1362* (2006.01)

(52) U.S. Cl.
CPC ............ *G02F 1/167* (2013.01); *G02F 1/13624* (2013.01)
USPC .................. 257/59; 349/143; 257/40; 257/60; 257/72

(58) Field of Classification Search
CPC . H01L 51/0545; H01L 27/1214; H01L 27/12; H01L 29/4908; H01L 29/66765; B82Y 10/00; G02F 1/136227; G02F 1/134336; G02F 1/133707
USPC ................... 257/40, 59, 60, 72; 349/143, 146
See application file for complete search history.

(56) References Cited

U.S. PATENT DOCUMENTS

| | | | |
|---|---|---|---|
| 6,627,957 B1 | 9/2003 | Yamazaki | |
| 6,958,489 B2 * | 10/2005 | Kimura | ........................... 257/40 |
| 2007/0080917 A1 | 4/2007 | Koyama et al. | |
| 2008/0296566 A1 | 12/2008 | Song et al. | |
| 2009/0303228 A1 * | 12/2009 | Maeda et al. | ................. 345/214 |

* cited by examiner

*Primary Examiner* — Cuong Q Nguyen
*Assistant Examiner* — Nishath Yasmeen
(74) *Attorney, Agent, or Firm* — McClure, Qualey & Rodack, LLP

(57) ABSTRACT

A pixel structure is formed in a pixel area and coupled to a scan line and a data line. The pixel structure includes a first transistor, a second transistor and a pixel electrode. The first transistor is formed in the pixel area and coupled to the scan line and the data line. The second transistor is formed in the pixel area and coupled to the first transistor. The pixel electrode is formed in the pixel area and coupled to the second transistor. The pixel electrode includes a main portion and a first branch portion. The first branch portion is disposed between the first transistor and the second transistor. An electrophoretic display including the pixel structure is also disclosed herein.

16 Claims, 5 Drawing Sheets

ELECTROPHORETIC DISPLAY AND PIXEL STRUCTURE THEREIN

RELATED APPLICATIONS

This application claims priority to Taiwan Patent Application Serial Number 99116350, filed May 21, 2010, which is herein incorporated by reference.

BACKGROUND

1. Technical Field

The present disclosure relates to a pixel structure. More particularly, the present disclosure relates to a pixel structure in an electrophoretic display.

2. Description of Related Art

For a conventional skill of manufacturing an electrophoretic display (also called electronic paper), during a fabrication process of a lower substrate, there are usually a silicon nitride (SiNx) dielectric layer and a thicker organic transparent layer formed between a thin-film transistor and a pixel electrode, such that on the lower substrate the pixel electrode can thus stride over the thin-film transistor without resulting in the increase of stray capacitance and affecting the electricity of the thin-film transistor, and the equivalent aperture ratio can be accordingly improved.

In prior art, less fabrication processes are used (e.g. the organic transparent layer is saved) in order to reduce the cost for manufacturing the foregoing lower substrate. This, however, results in that the pixel electrode has to be avoided from being formed over the thin-film transistor so as to prevent the increase of the stray capacitance and prevent the pixel electrode from affecting the electricity of the thin-film transistor.

However, when the electrophoretic display operates, charging particles inside the electrophoretic display are mainly driven by an electric field formed between the pixel electrode of the lower substrate and a thin-film transparent electrode of an upper substrate. Thus, if the pixel electrode has to be avoided from being formed over the thin-film transistor, the effective area for driving the charging particles between the upper electrode and the lower electrode will thus become decreased, resulting in that the electric field becomes weakened and cannot effectively drive the charging particles inside the electrophoretic display. As a result, the quality of displayed images will deteriorate.

SUMMARY

In accordance with one embodiment of the present invention, an electrophoretic display is provided. The electrophoretic display comprises a first substrate, a second substrate and an electrophoretic layer. The first substrate comprises a plurality of data lines, a plurality of scan lines and a plurality of pixel structures. The scan lines intersect the data lines to form a plurality of pixel areas. The pixel structures are correspondingly disposed in the pixel areas, in which each of the pixel structures is connected with the corresponding scan line and the corresponding data line. Each of the pixel structures comprises a first transistor, a second transistor and a pixel electrode. The first transistor is formed in the corresponding pixel area and coupled to the corresponding scan line and the corresponding data line. The second transistor is formed in the corresponding pixel area and coupled to the first transistor. The pixel electrode is formed in the corresponding pixel area and coupled to the second transistor, and the pixel electrode comprises a main portion and a first branch portion disposed between the first transistor and the second transistor.

The second substrate is disposed with respect to the first substrate. The electrophoretic layer is disposed between the first substrate and the second substrate.

In accordance with another embodiment of the present invention, a pixel structure formed in a pixel area and coupled to a scan line and a data line is provided. The pixel structure comprises a first transistor, a second transistor and a pixel electrode. The first transistor is formed in the pixel area and coupled to the scan line and the data line. The second transistor is formed in the pixel area and coupled to the first transistor. The pixel electrode is formed in the pixel area and coupled to the second transistor. The pixel electrode comprises a main portion and a first branch portion disposed between the first transistor and the second transistor.

It is to be understood that both the foregoing general description and the following detailed description are by examples, and are intended to provide further explanation of the invention as claimed.

BRIEF DESCRIPTION OF THE DRAWINGS

The disclosure can be more fully understood by reading the following detailed description of the embodiments, with reference to the accompanying drawings as follows.

DESCRIPTION OF THE EMBODIMENTS

In the following description, several specific details are presented to provide a thorough understanding of the embodiments of the present invention. One skilled in the relevant art will recognize, however, that the present invention can be practiced without one or more of the specific details, or in combination with or with other components, etc. In other instances, well-known implementations or operations are not shown or described in detail to avoid obscuring aspects of various embodiments of the present invention.

The terms used in this specification generally have their ordinary meanings in the art and in the specific context where each term is used. The use of examples anywhere in this specification, including examples of any terms discussed herein, is illustrative only, and in no way limits the scope and meaning of the invention or of any exemplified term. Likewise, the present invention is not limited to various embodiments given in this specification.

As used herein, the terms "comprising," "including," "having," "containing," "involving," and the like are to be understood to be open-ended, i.e., to mean including but not limited to.

Reference throughout the specification to "one embodiment" or "an embodiment" means that a particular feature, structure, implementation, or characteristic described in connection with the embodiment is included in at least one embodiment of the present invention. Thus, uses of the phrases "in one embodiment" or "in an embodiment" in various places throughout the specification are not necessarily all referring to the same embodiment. Furthermore, the particular features, structures, implementation, or characteristics may be combined in any suitable manner in one or more embodiments.

Figure 1:
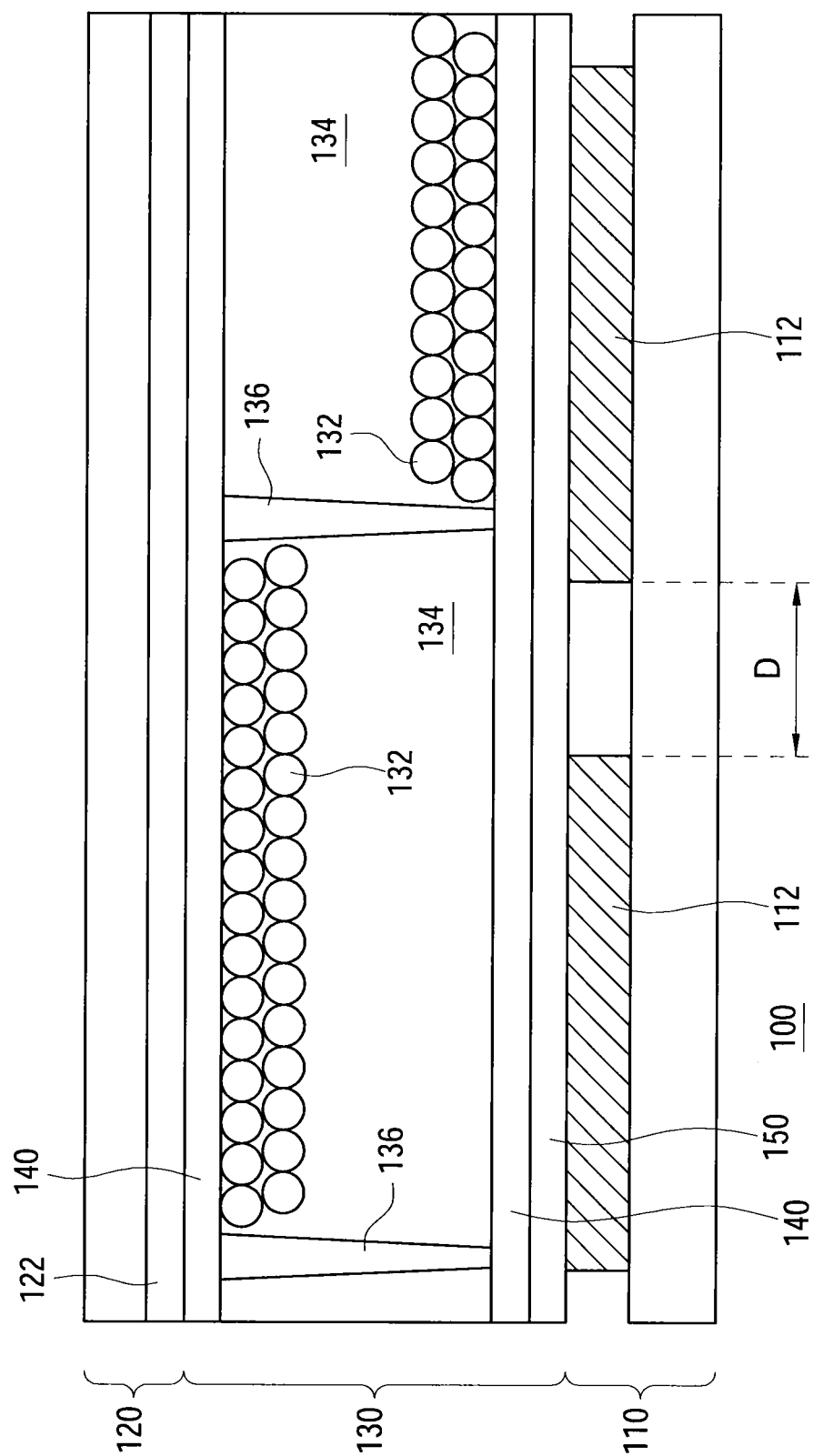
FIG. 1 is a diagram of an electrophoretic display in accordance with one embodiment of the present invention.

FIG. 1 is a diagram of an electrophoretic display in accordance with one embodiment of the present invention. The electrophoretic display (EPD) 100 includes a lower substrate 110, an upper substrate 120 and an electrophoretic layer 130. The lower substrate 110 is disposed with respect to the upper substrate 120, and the electrophoretic layer 130 is disposed between the lower substrate 110 and the upper substrate 120. The electrophoretic layer 130 may include a microcup-based electrophoretic layer (as shown in FIG. 1) or a microcapsule-based electrophoretic layer, in which the technical terms "microcup" and "microcapsule" are well-known skills for one person skilled in the art of this field. Taking the microcup-based electrophoretic layer for example, it may include charging particles 132 and electrophoresis material layers 134 protected by passivation layers 140, which are above and below the charging particles 132 and the electrophoresis material layers 134, and separated by a separate wall 136 to form a plurality of blocks. These are well-known skills for one person skilled in the art, so unnecessary details are not described. In addition, there may be an adhesion layer 150 selectively used for adhering the electrophoretic layer 130 to the lower substrate 110. Moreover, the charging particles 132 may include white particles, black particles or colored particles, and the electrophoresis material layers 134 may include transparent electrophoresis material or colored electrophoresis material.

On the other hand, the lower substrate 110 includes pixel electrodes 112. The pixel electrodes 112 may be, for example, transparent conductive electrodes, material of which may include indium-tin-oxide (ITO), indium-zinc-oxide (IZO) or aluminum-zinc-oxide (AZO), or may be, for example, reflective conductive electrodes, material of which may include copper (Au), aluminum (Al), silver (Ag), titanium (Ti), molybdenum (Mo), etc. but not be limited thereto. The upper substrate 120 also includes an opposite electrode 122, and the charging particles 132 in the electrophoretic layer 130 are driven by the electric field generated between the opposite electrode 122 and the pixel electrodes 112. In one various embodiment, the opposite electrode 122 may also be disposed in the lower substrate 110 to be interlacingly arranged with the pixel electrodes 112, so as to form a traverse electric field for controlling the charging particles 132 to move horizontally, in order to achieve the object of displaying images.

It is noticed that for the pixel electrodes 112 in the lower substrate 110, the electric field generated between the pixel electrodes 112 and the opposite electrode 122 will become weak if a distance D between the pixel electrodes 112 is too long, thus causing that the appropriate electric field around the distance D cannot be generated and the charging particles 132 in the electrophoretic layer 130 cannot be effectively driven, resulting in a problem of inaccurately displaying images.

Figure 2A:
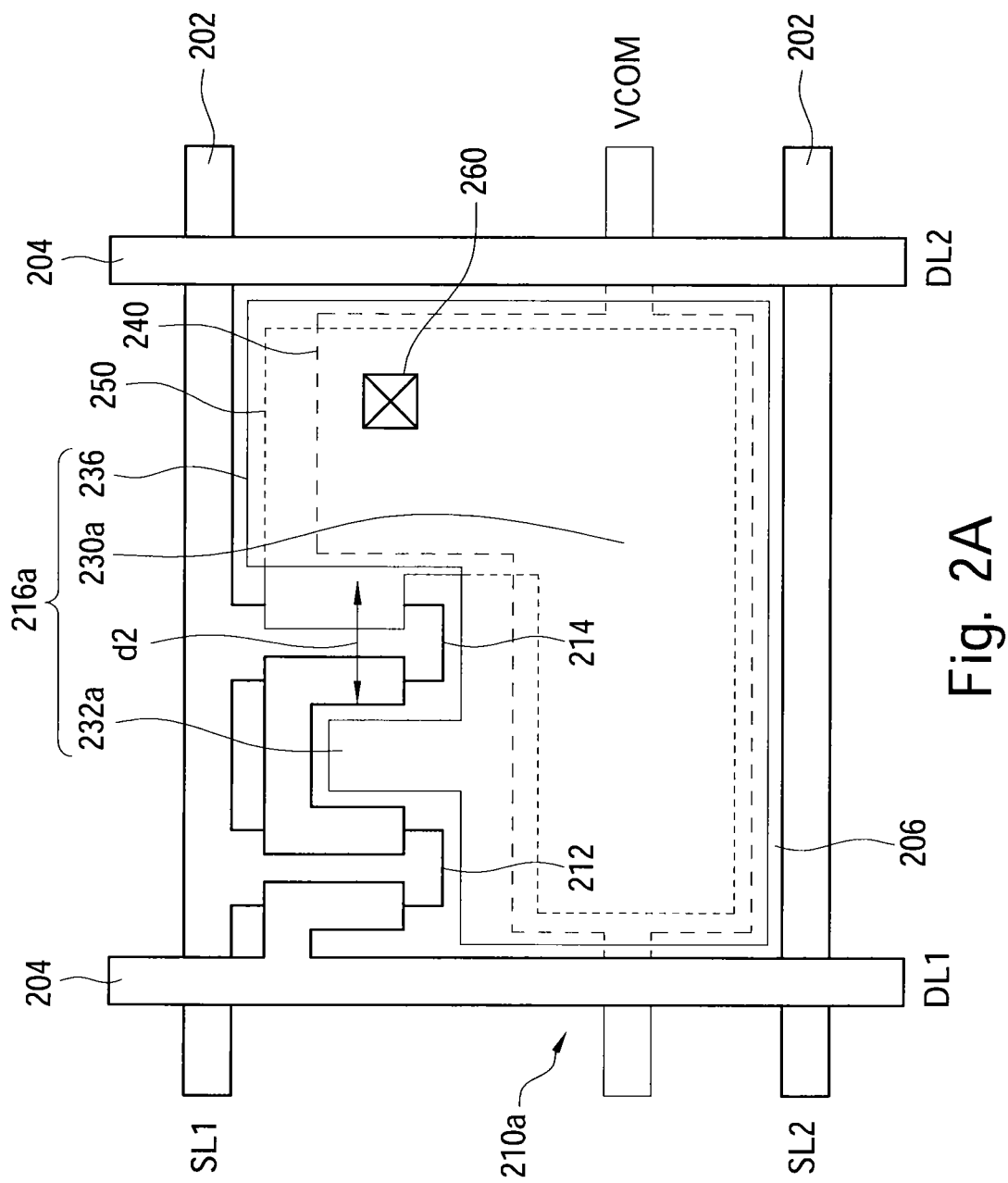
FIG. 2A is a diagram of the pixel structure in the lower substrate as shown in FIG. 1, in accordance with one embodiment of the present invention.

On the other hand, the lower substrate 110 may further include a plurality of data lines, a plurality of scan lines and a plurality of pixel structures. The scan lines intersect the data lines to form a plurality of pixel areas arranged in an array. The pixel structures are correspondingly disposed in the pixel areas, and each of the pixel structures is connected with the corresponding scan line and the corresponding data line (as shown in FIG. 2A). FIG. 2A is a diagram of the pixel structure in the lower substrate as shown in FIG. 1, in accordance with one embodiment of the present invention. The scan lines 202 intersect the data lines 204 to form the pixel area 206, and the pixel structure 210a is correspondingly disposed in the pixel area 206 and connected with the corresponding scan lines 202 and the corresponding data lines 204.

The pixel structure 210a includes two thin-film transistors (i.e. first transistor 212 and second transistor 214) and the pixel electrode 216a. The first transistor 212 is formed in the pixel area 206 and coupled to the corresponding scan line 202 and the corresponding data line 204 (e.g. scan line SL1 and data line DL1). The second transistor 214 is formed in the pixel area 206 and coupled to the first transistor 212 and the corresponding scan line 202 (e.g. scan line SL1). The pixel electrode 216a further includes a main portion 230a and a first branch portion 232a. The main portion 230a is formed in the pixel area 206 at a part which is not covering the first transistor 212 and the second transistor 214, as shown in FIG. 2A, and is mainly placed at a lower half of the pixel area 206 in the figure. The first branch portion 232a is formed in the pixel area 206 at a part between the first transistor 212 and the second transistor 214, which is similarly not covering the first transistor 212 and the second transistor 214.

Figure 3:
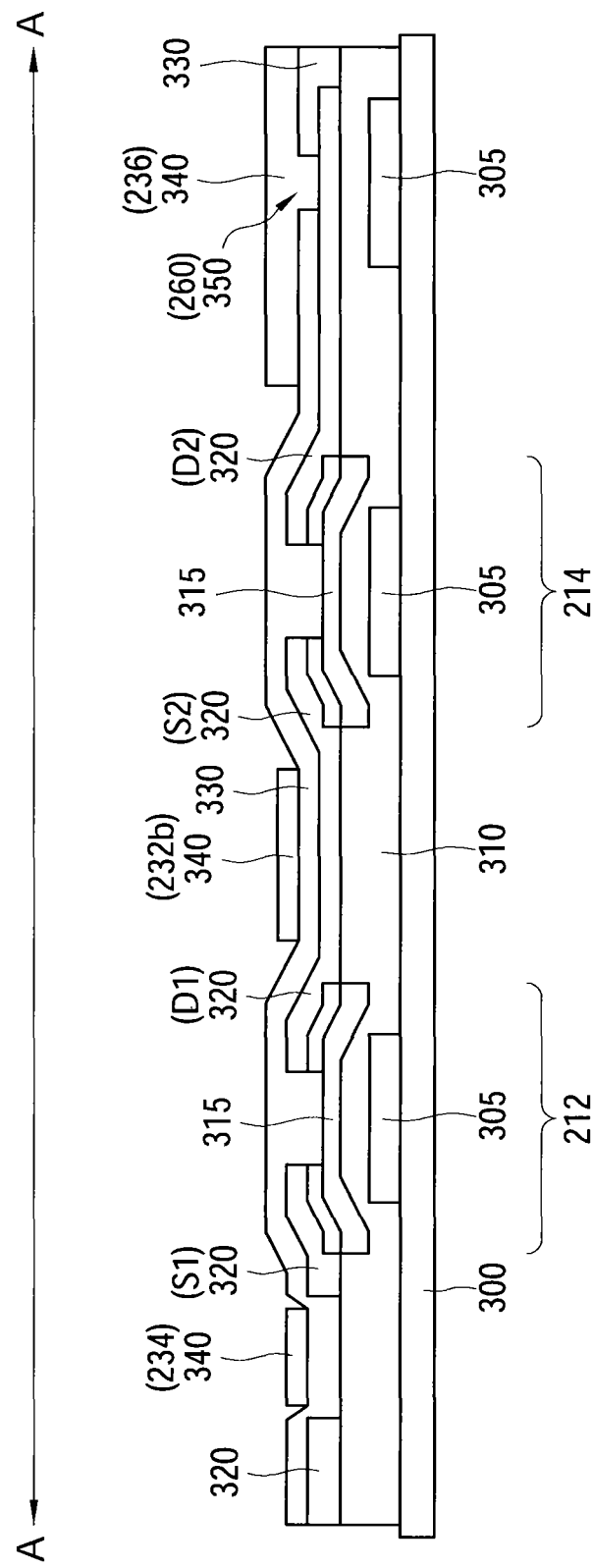
FIG. 3 is a sectional diagram of the pixel structure shown in FIG. 2B along line AA in accordance with one embodiment of the present invention.

Refer to FIG. 2A and FIG. 3 at the same time. The pixel structure 210a shown in FIG. 2A may further include a common electrode 240 (corresponding to a part of a first patterned metal layer 305 shown in FIG. 3) and a conductive electrode 250 (corresponding to a part of a second patterned metal layer 320 shown in FIG. 3). The common electrode 240 may be coupled to a common voltage VCOM and thus has a common voltage level. The conductive electrode 250 may be coupled via a through-hole (TH) 260 to the pixel electrode 216a (e.g. a third branch portion 236 of the pixel electrode 216a, which is disclosed latter) and associate with the common electrode 240 having the common voltage level to form an equivalent storage capacitor.

Figure 2B:
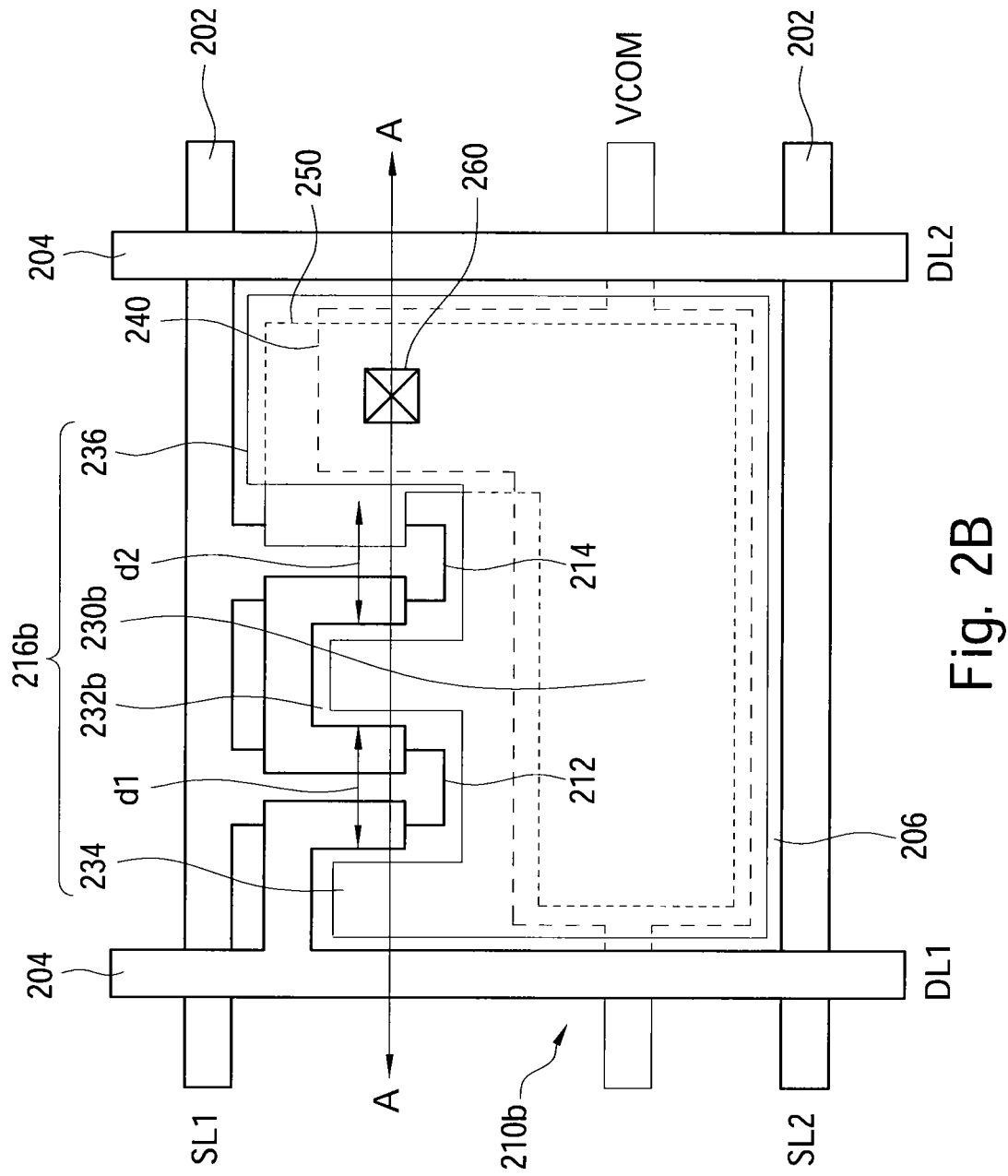
FIG. 2B is a diagram of the pixel structure in the lower substrate as shown in FIG. 1, in accordance with another embodiment of the present invention.

FIG. 2B is a diagram of the pixel structure in the lower substrate as shown in FIG. 1, in accordance with another embodiment of the present invention. Similar to FIG. 2A, the pixel structure 210b includes the first transistor 212, the second transistor 214 and the pixel electrode 216b, and the pixel electrode 216b further includes the main portion 230b, the first branch portion 232b and the second branch portion 234. The main portion 230b is formed in the pixel area 206 at the part which is not covering the first transistor 212 and the second transistor 214 and is mainly placed at the lower half of the pixel area 206 in the figure. The first branch portion 232b is formed in the pixel area 206 at the part between the first transistor 212 and the second transistor 214, and is similarly not covering the first transistor 212 and the second transistor 214. The second branch portion 234 is formed between the first transistor 212 and a corresponding data line (e.g. data line DL1) which is adjacent to the first transistor 212. Moreover, the pixel structure 210b may also include the above-mentioned common electrode 240, the conductive electrode 250 and the through-hole 260.

In the present embodiment, a distance d1 between the first branch portion 232b and the second branch portion 234 is in a range between about 10 μm and about 30 μm. Furthermore, in the present embodiment, the distance d1 between the first branch portion 232b and the second branch portion 234 is preferably in a range between about 20 μm and about 30 μm, or preferably in a range between about 10 μm and about 20 μm.

In addition, the pixel electrode 216a shown in FIG. 2A or the pixel electrode 216b shown in FIG. 2B may further include a third branch portion 236, and the third branch portion 236 is formed between the second transistor 214 and a corresponding data line (e.g. data line DL2) which is adjacent to the second transistor 214. Moreover, a distance d2 between the third branch portion 236 and the first branch portion 232a shown in FIG. 2A or the first branch portion 232b shown in FIG. 2B, is in a range between about 10 μm and about 30 μm, and may be preferably in a range between about 20 μm and about 30 μm, or preferably in a range between about 10 μm and about 20 μm.

It is noticed that when the pixel electrode is prevented from being formed above the transistor in order to save the fabrication process, the foregoing two transistors are fabricated to be closely coupled to each other, such that the distance (similar to distance D shown in FIG. 1) between the pixel electrodes at two sides (i.e. the second branch portion 234 and the third branch portion 236 as shown in FIG. 2B) is too long, resulting in that the electric field around the distance between the lower and upper substrates becomes weak and cannot effectively drive the charging particles nearby the transistor in the electrophoretic layer 130 shown in FIG. 1, and the quality of the displayed image is also affected.

For the foregoing reason, the pixel electrode (e.g. first branch portion 232b shown in FIG. 2B) is formed between the above-mentioned two transistors in the embodiments of the present invention, such that the distance between the pixel electrodes, e.g. d1 or d2 shown in FIG. 2B, is shorter than the distance between the pixel electrodes in one comparison example. Therefore, the weakened electric field resulted from the long distance between the adjacent pixel electrodes in the comparison example can be improved, and thus the quality of the displayed image can be improved as well.

FIG. 3 is a sectional diagram of the pixel structure shown in FIG. 2B along line AA in accordance with one embodiment of the present invention. Refer to FIG. 2B and FIG. 3. Initially, a first patterned metal layer 305 is formed on the substrate 300, to be the scan line 202 (e.g. scan line SL1) and the gate electrodes of the first transistor 212 and the second transistor 214, such that the gate electrodes of the first transistor 212 and the second transistor 214 are coupled to the corresponding scan line 202 (e.g. scan line SL1). Then, a gate insulation layer 310 is covered on the substrate 300 and the first patterned metal layer 305, in which the material of the gate insulation layer 310 may include dielectric material such as silicon oxide, silicon nitride (SiNx) or silicon oxynitride. After that, an active layer 315 is formed on the gate insulation layer 310, in which the material of the active layer 315 is semiconductor material which may include amorphous silicon (α-Si), poly silicon (poly-Si), epitaxial silicon or indium-gallium-zinc oxide (IGZO). Thereafter, a second patterned metal layer 320 is formed to be the data line (e.g. data line DL1), the drain electrode (e.g. D1) and the source electrode (e.g. S1) of the first transistor 212, and the drain electrode (e.g. D2) and the source electrode (e.g. S2) of the second transistor 214. A passivation layer 330 is then covered on the foregoing structure, and an electrode layer 340 is formed on the passivation layer 330, such that the electrode layer 340 can be used as the pixel electrode 216b shown in FIG. 2B. The material of the passivation layer 330 may include dielectric material such as silicon oxide, silicon nitride (SiNx), silicon oxynitride, etc. The material of the electrode layer 340 may include indium-tin-oxide (ITO), indium-zinc-oxide (IZO) or aluminum-zinc-oxide (AZO). Hereinafter, the source electrode S1 of the first transistor 212 is coupled to the data line 204 (e.g. DL1) which is adjacent to the first transistor 212, the drain electrode D1 of the first transistor 212 is coupled to the second transistor 214, the source electrode S2 of the second transistor 214 is coupled to the drain electrode D1 of the first transistor 212, and the pixel electrode 216b (e.g. the third branch portion 236) may be directly coupled to the drain electrode D2 of the second transistor 214 or coupled via the through-hole 350 to the drain electrode D2.

Figure 4:
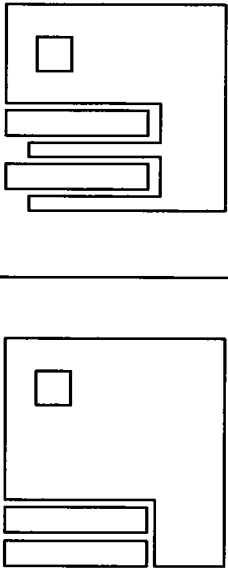
FIG. 4 is a comparison table of structure characteristics, after the fabrication is completed, of the pixel structure shown in FIG. 2 and the pixel structure of the comparison example in accordance with one embodiment of the present invention.

FIG. 4 is a comparison table of structure characteristics, after the fabrication is completed, of the pixel structure shown in FIG. 2 and the pixel structure of the comparison example in accordance with one embodiment of the present invention. As shown in FIG. 4, the pixel structure in the embodiment of the present invention includes the pixel electrode with branch portions, but the pixel structure in the comparison example includes closely coupled two transistors and the pixel structure has no branch portions between the two transistors. As can be known from FIG. 4, under the condition with the same pixel area of 23103 $\mu m^2$, the distance of 28.5 μm between the pixel electrodes of the pixel structure in the embodiment of the present invention is apparently shorter than the distance of 54 μm between the pixel electrodes of the pixel structure in the comparison example. Thus, the pixel structure of the present invention improves the problem that the charging particles cannot be effectively driven because the distance between the pixel electrodes is too long.

In conclusion, in the pixel structure in the embodiments of the present invention, there is at least one pixel electrode formed between the two thin-film transistors such that the distance between the pixel electrodes is shorter than the distance between the pixel electrodes conventionally designed in prior art. As a result, the pixel structure of the present invention not only improves the problem of the electric field becoming weak caused by the long distance between the pixel electrodes so as to effectively drive the charging particles in the electrophoretic layer, but also improves the displayed image quality of the electrophoretic display as well.

As is understood by a person skilled in the art, the foregoing embodiments of the present invention are illustrative of the present invention rather than limiting of the present invention. It is intended to cover various modifications and similar arrangements included within the spirit and scope of the appended claims, the scope of which should be accorded with the broadest interpretation so as to encompass all such modifications and similar structures.

What is claimed is:

1. An electrophoretic display comprising:
   a first substrate, comprising:
   a plurality of data lines;
   a plurality of scan lines intersecting the data lines to form a plurality of pixel areas; and
   a plurality of pixel structures correspondingly disposed in the pixel areas, each of the pixel structures being connected with the corresponding scan line and the corresponding data line, and each of the pixel structures comprising:
   a first transistor formed in the corresponding pixel area and coupled to the corresponding scan line and the corresponding data line;
   a second transistor formed in the corresponding pixel area and coupled to the first transistor; and
   a pixel electrode formed in the corresponding pixel area and coupled to the second transistor, the pixel electrode comprising a main portion and a first branch portion, the first branch portion being disposed between the first transistor and the second transistor;
   a second substrate disposed with respect to the first substrate; and
   an electrophoretic layer disposed between the first substrate and the second substrate, wherein the second transistor comprises a gate electrode, a source electrode and a drain electrode, the gate electrode is coupled to the corresponding scan line, the source electrode is coupled to the first transistor, and the drain electrode is coupled to the pixel electrode.

2. The electrophoretic display as claimed in claim 1, wherein the pixel electrode further comprises a second branch portion formed between the first transistor and a data line which is adjacent to the first transistor.

3. The electrophoretic display as claimed in claim 2, wherein a distance between the first branch portion and the second branch portion is in a range between about 10 mm and about 30 mm.

4. The electrophoretic display as claimed in claim 3, wherein the distance between the first branch portion and the second branch portion is in a range between about 20 mm and about 30 mm.

5. The electrophoretic display as claimed in claim 2, wherein the pixel electrode further comprises a third branch portion formed between the second transistor and a data line which is adjacent to the second transistor.

6. The electrophoretic display as claimed in claim 5, wherein a distance between the first branch portion and the second branch portion is in a range between about 10 mm and about 30 mm, and a distance between the first branch portion and the third branch portion is in a range between about 10 mm and about 30 mm.

7. The electrophoretic display as claimed in claim 6, wherein the distance between the first branch portion and the second branch portion is in a range between about 20 mm and about 30 mm, and the distance between the first branch portion and the third branch portion is in a range between about 20 mm and about 30 mm.

8. The electrophoretic display as claimed in claim 1, wherein the first transistor comprises a gate electrode, a source electrode and a drain electrode, the gate electrode is coupled to the corresponding scan line, the source electrode is coupled to the corresponding data line adjacent to the first transistor, and the drain electrode is coupled to the second transistor.

9. The electrophoretic display as claimed in claim 1, wherein gate electrodes of the first transistor and the second transistor are coupled to the corresponding scan line.

10. The electrophoretic display as claimed in claim 1, wherein the electrophoretic layer comprises a microcup-based electrophoretic layer or a microcapsule-based electrophoretic layer.

11. A pixel structure formed in a pixel area and coupled to a scan line and a data line, the pixel structure comprising:
a first transistor formed in the pixel area and coupled to the scan line and the data line;
a second transistor formed in the pixel area and coupled to the first transistor; and
a pixel electrode formed in the pixel area and coupled to the second transistor, the pixel electrode comprising a main portion and a first branch portion, the first branch being disposed between the first transistor and the second transistor, wherein the second transistor comprises a gate electrode, a source electrode and a drain electrode, the gate electrode is coupled to the scan line, the source electrode is coupled to the first transistor, and the drain electrode is coupled to the pixel electrode;
wherein the pixel electrode further comprises a second branch portion formed between the first transistor and a data line which is adjacent to the first transistor;
wherein the pixel electrode further comprises a third branch portion formed between the second transistor and a data line which is adjacent to the second transistor.

12. The pixel structure as claimed in claim 11, wherein a distance between the first branch portion and the second branch portion is in a range between about 20 um and about 30 um.

13. The pixel structure as claimed in claim 11, wherein a distance between the first branch portion and the second branch portion is in a range between about 20 um and about 30 um, and a distance between the first branch portion and the third branch portion is in a range between about 20 um and about 30 um.

14. The pixel structure as claimed in claim 11, wherein the first transistor comprises a gate electrode, a source electrode and a drain electrode, the gate electrode is coupled to the scan line, the source electrode is coupled to the data line, and the drain electrode is coupled to the second transistor.

15. The pixel structure as claimed in claim 11, wherein gate electrodes of the first transistor and the second transistor are coupled to the scan line.

16. An electrophoretic display comprising:
a first substrate, comprising:
a plurality of data lines;
a plurality of scan lines intersecting the data lines to form a plurality of pixel areas; and
a plurality of pixel structures correspondingly disposed in the pixel areas, each of the pixel structures being connected with the corresponding scan line and the corresponding data line, and each of the pixel structures comprising:
a first transistor formed in the corresponding pixel area and coupled to the corresponding scan line and the corresponding data line;
a second transistor formed in the corresponding pixel area and coupled to the first transistor; and
a pixel electrode formed in the corresponding pixel area and coupled to the second transistor, the pixel electrode comprising a main portion and a first branch portion, the first branch portion being disposed between the first transistor and the second transistor, wherein the pixel electrode further comprises a second branch portion formed between the first transistor and a data line which is adjacent to the first transistor, wherein the pixel electrode further comprises a third branch portion formed between the second transistor and a data line which is adjacent to the second transistor;
a second substrate disposed with respect to the first substrate; and
an electrophoretic layer disposed between the first substrate and the second substrate.

* * * * *